US010669410B2

(12) United States Patent
Liu et al.

(10) Patent No.: US 10,669,410 B2
(45) Date of Patent: Jun. 2, 2020

(54) PROCESS FOR PRODUCING MULTIMODAL POLYETHYLENE IN-SITU BLENDS INCLUDING ULTRA-HIGH MOLECULAR WEIGHT FRACTIONS

(71) Applicant: BOREALIS AG, Vienna (AT)

(72) Inventors: Yi Liu, Engerwitzdorf (AT); Qizheng Dou, Linz (AT); Alexandra Romina Albunia, Linz (AT)

(73) Assignee: BOREALIS AG, Vienna (AT)

(*) Notice: Subject to any disclaimer, the term of this patent is extended or adjusted under 35 U.S.C. 154(b) by 46 days.

(21) Appl. No.: 15/539,130

(22) PCT Filed: Dec. 21, 2015

(86) PCT No.: PCT/EP2015/002587
§ 371 (c)(1),
(2) Date: Jun. 22, 2017

(87) PCT Pub. No.: WO2016/102061
PCT Pub. Date: Jun. 30, 2016

(65) Prior Publication Data
US 2017/0362417 A1    Dec. 21, 2017

(30) Foreign Application Priority Data
Dec. 22, 2014   (EP) ..................... 14004367

(51) Int. Cl.
*C08L 23/08* (2006.01)
*C08L 23/06* (2006.01)
*C08F 10/02* (2006.01)
*B29B 9/12* (2006.01)
(Continued)

(52) U.S. Cl.
CPC ............. *C08L 23/06* (2013.01); *B29B 9/12* (2013.01); *C08F 2/00* (2013.01); *C08F 10/02* (2013.01); *C08L 23/08* (2013.01); *C08L 23/0815* (2013.01); *B29B 9/06* (2013.01); *C08F 2500/05* (2013.01); *C08L 2205/025* (2013.01); *C08L 2207/068* (2013.01); *C08L 2310/00* (2013.01)

(58) Field of Classification Search
CPC .. C08F 2/001; C08F 10/02; C08F 2/00; C08F 2500/05; C08L 23/0815; C08L 23/06; C08L 2205/025; C08L 2207/068; C08L 2310/00; B29B 9/12
See application file for complete search history.

(56) References Cited
U.S. PATENT DOCUMENTS 3,242,150 A   3/1966   Scoggin
3,324,093 A   6/1967   Alleman
3,374,211 A   3/1968   Marwil et al.
(Continued)

FOREIGN PATENT DOCUMENTS

EP    428054 A1    5/1991
EP    479186 A2    1/1992
(Continued)

OTHER PUBLICATIONS

Klimke et al., "Optimisation and Application of Polyolefin Branch Quantification by Melt-State 13C NMR Spectroscopy", Macromol. Chem. Phys. 2006;207:382-395.
Parkinson et al, "Effect of Branch Length on 13C NMR Relaxation Properties in Molten Poly[ethylene-co-(a-olefin)] Model Systems", Macromol. Chem. Phys. 2007;208:2128-2133.
Filip et al., "Heteronuclear decoupling under fast MAS by a rotor-synchronized Hahn-echo pulse train", Mag. Resn. 2005, 176, 239-243.
Griffin et al., "Low-load rotor-synchronised Hahn-echo pulse train (RS-HEPT) 1H decoupling in solid-state NMR: factors affecting MAS spin-echo dephasing times", Mag. Res. in Chem. 2007 45, S1, S198-S208.
(Continued)

*Primary Examiner* — Nathan M Nutter
(74) *Attorney, Agent, or Firm* — Insigne LLP

(57) ABSTRACT

The present application relates to a process for producing a multimodal polyethylene composition comprising the steps of polymerizing a polyethylene fraction (A-1) having a weight average molecular weight Mw of equal to or more than 500 kg/mol to equal to or less than 10,000 kg/mol and a density of equal to or more than 915 kg/m$^3$ to equal to or less than 960 kg/m$^3$ in one reaction step and polymerizing a polyethylene fraction (A-2) having a lower weight average molecular weight Mw as polyethylene fraction (A-1) and a density of equal to or more than 910 kg/m$^3$ to equal to or less than 975 kg/m$^3$ in a second reaction step of a sequential multistage process wherein one of said polyethylene fractions is polymerized in the presence of the other of said polyethylene fractions to form a first polyethylene resin (A) having a weight average molecular weight Mw of equal to or more than 150 kg/mol to equal to or less than 1,500 kg/mol, and a density of equal to or more than 910 kg/m$^3$ to equal to or less than 975 kg/m$^3$, wherein the weight average molecular weight Mw of the first polyethylene resin (A) is lower than the weight average molecular weight Mw of the polyethylene fraction (A-1), blending the first polyethylene resin (A) with a second polyethylene resin (B) having a weight average molecular weight Mw of equal to or more than 50 kg/mol to less than 500 kg/mol, and a density of equal to or more than 910 kg/m$^3$ to equal to or less than 970 kg/m$^3$ to form said multimodal polyethylene composition, wherein the multimodal polyethylene composition a melt flow rate MFR$_5$ (190° C., 5 kg) of 0.01 to 10 g/10 min and a density of equal to or more than 910 kg/m$^3$ to equal to or less than 970 kg/m$^3$ a polyethylene composition obtainable by said process and the polyethylene resin of said first polymerization step.

6 Claims, 1 Drawing Sheet

Figure 1:
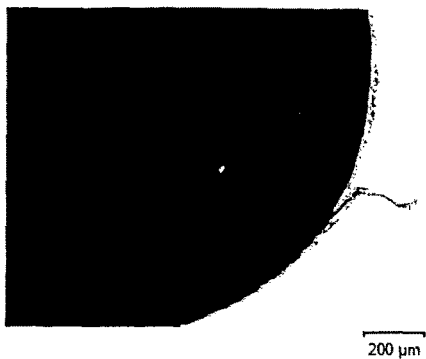

(51) Int. Cl.
*C08F 2/00* (2006.01)
*B29B 9/06* (2006.01)

(56) References Cited

U.S. PATENT DOCUMENTS

| | | | |
|---|---|---|---|
| 3,405,109 | A | 10/1968 | Rohlfing |
| 4,582,816 | A | 4/1986 | Miro |
| 5,391,654 | A | 2/1995 | Ahvenainen et al. |
| 6,346,575 | B1* | 2/2002 | Debras et al. ........ C08F 110/02 525/191 |
| 2009/0252910 | A1* | 10/2009 | Baecknnan et al. .. C08F 210/16 428/36.92 |
| 2011/0288237 | A1* | 11/2011 | Gustafsson et al. .... C08F 10/02 525/240 |
| 2015/0051364 | A1* | 2/2015 | Vahteri et al. .......... C08L 23/06 526/348.6 |
| 2016/0143231 | A2* | 5/2016 | Motha et al. ........... C08L 23/06 239/547 |

FOREIGN PATENT DOCUMENTS

| | | |
|---|---|---|
| EP | 688794 A1 | 12/1995 |
| EP | 810235 A1 | 12/1997 |
| EP | 891990 A2 | 1/1999 |
| EP | 1310295 A2 | 5/2003 |
| EP | 1415999 A2 | 5/2004 |
| EP | 1591460 A1 | 11/2005 |
| EP | 1655334 A1 | 5/2006 |
| EP | 2186833 A | 5/2010 |
| EP | 2570455 A1 | 3/2013 |
| EP | 2620472 A1 | 7/2013 |
| WO | 96/19503 A1 | 6/1996 |
| WO | 96/32420 A1 | 10/1996 |
| WO | 99/51646 A1 | 10/1999 |
| WO | 01/55230 A1 | 8/2001 |
| WO | 2005/118655 A1 | 12/2005 |
| WO | 2006/063771 A1 | 6/2006 |
| WO | 2007/025640 A1 | 3/2007 |

OTHER PUBLICATIONS

Castignolles et al., "Detectoin and quantification of branching in polyacrylateees by size-exclusion chromatography (SEC) and melt-state 13C NMR spectroscopy", Polymer 50 (2009) 2373-2383.

Zhou et al., "A new decoupling method for accurate quantification of polyethylene copolymer compoisition and triad sequence distribution with 13C NMR", J. Mag. Reson. 187 (2007) 225.

Busico et al., "Alk-1-ene Polymerization in the Presence of a Monocyclopentadienyl Zirconium(IV) Acetamidinate Catalyst: Microstructural and Mechanistic Insights", Macromol. Rapid Commun. 2007, 28, 1128-34.

Randall, "A Review of High Resolution Liquid 13Carbon Nuclear Magnetic Resonance Characterizations of Ethylene-Based Polymers", JMS-REV. Macromol. Chem. Phys., C29 (2 & 3), 201-317 (1989).

Heino et al., "Rheological Characterization of Polyethylene Fractions", Theoretical and Applied Rheology, Proc. Int. Congr. Rheol., 11th (1992) 1, 360-362 (1992).

Heino et al., "The influence of molecular structure on some rheological properties of polyethylene", Annual Transactions of the Nordic Rheology Society, (1995).

Definition of terms relating to the non-ultimate mechanical properties of polymers, Pure & Appl. Chem., vol. 70, No. 3, pp. 701-754, 1998.

International Search Report on Patentability of PCT/EP2015/002587 dated Jan. 27, 2017.

International Search Report of International Application PCT/EP2015/002587 dated Mar. 9, 2016.

Ruwendaal, Polymer Extrusion, Hanser Publishers, Munich, 1986 (ISBN 3-446-14196-0), pp. 439.

* cited by examiner

PROCESS FOR PRODUCING MULTIMODAL POLYETHYLENE IN-SITU BLENDS INCLUDING ULTRA-HIGH MOLECULAR WEIGHT FRACTIONS

The present application relates to a process for producing a multimodal polyethylene composition with an ultra-high molecular weight fraction by melt-blending the ultra-high fraction in form of an in-situ polymerized master batch. The resultant multimodal polyethylene composition shows an improved homogeneity at a minimum degradation during melt-blending.

BACKGROUND OF THE INVENTION

In multimodal polyethylene resins the high molecular weight fraction usually with comonomer incorporation is responsible for the strength, including long term strength and how well this fraction is incorporated in the total polymer mass is the key for the final product properties, in particular for high-strength and high performance products such as PE100 or PE100+ pipe resins, high-end film resins or blow moulding resins.

Multimodal polyolefins, especially multimodal polyethylenes are inherently difficult to homogenize due to a large difference in viscosities and a large difference in particle size of the various reactor powder particles. Especially in sequential polymerization processes the high molecular weight and high viscous powder particles are normally considerably larger than the lower molecular weight particles. During the homogenization step the particles of high molecular weight polyethylene are difficult to homogenize within the polymer melt so that so-called "white spots" occur in the compounded material. These white spots usually have a size of below 10 to about 50 micrometer, even though they occasionally can have a size of up to 0.1 mm or even 0.5 mm, and consist of high molecular weight polymer particles that have not been adequately dispersed in the composition. Further, when compounding polymer compositions e.g. for the production of films gel particles with a size of about 0.01 to 1 mm often occur. These gel particles also consist of high molecular weight polymer particles not adequately dispersed and appear as disfiguring inhomogeneities in the finished film. Still further, inhomogeneities in multimodal polymer compositions may also increase roughness of the surface of articles produced thereof.

One possibility to break up these high viscous particles is to use higher shear forces during compounding. Higher shear forces are usually applied to the extent which is necessary with regard to the needs, the degradation limits of the polymer, energy costs, costs for necessary process stabilizers and other physical limits such as low viscosities and lower shear forces due to high temperatures generated and limited cooling capacity.

High shear forces, however, applied as shear flow which is the predominant flow in extruders and mixers, are in most cases not sufficient to break up high molecular weight polymer particles in multimodal polyethylene resins with large viscosity differences between the polymer fractions.

These compatibility problems particularly apply in the case an ultra high molecular weight fraction (UHMW) is included into a polyethylene composition for further improving strength properties, as it becomes more and more difficult to homogenize the ultra high molecular weight particles into the polymer matrix.

Thus, there is still a need for methods to incorporate ultra high molecular weight fractions into multimodal polyethylene resins as such that a homogeneous blend with a minimum of UHMW particles, so-called white spots is obtained at a minimum degradation of the polymer chains.

It has surprisingly been found that this object can be achieved when polymerizing the UHMW polyethylene fraction together with a polyethylene resin of lower weight average molecular weight in a two steps of a sequential multistage polymerization process to form a so-called in-situ master batch. This in-situ master batch is subsequently blended with a polyethylene resin to form the desired polyethylene composition. Said composition surprisingly shows a low amount of white spots even when blended under mild conditions in order to avoid degradation.

SUMMARY OF THE INVENTION

The present invention is based on the surprising finding that the above-mentioned improved homogeneity can be achieved by a process for producing a multimodal polyethylene composition comprising the following steps:

i) polymerizing a polyethylene fraction (A-1) having a weight average molecular weight Mw of equal to or more than 500 kg/mol to equal to or less than 10,000 kg/mol and a density of equal to or more than 915 kg/m$^3$ to equal to or less than 960 kg/m$^3$ in one reaction step and polymerizing a polyethylene fraction (A-2) having a lower weight average molecular weight Mw as polyethylene fraction (A-1) and a density of equal to or more than 910 kg/m$^3$ to equal to or less than 975 kg/m$^3$ in a second reaction step of a sequential multistage process wherein one of said polyethylene fractions is polymerized in the presence of the other of said polyethylene fractions to form a first polyethylene resin (A) having a weight average molecular weight Mw of equal to or more than 150 kg/mol to equal to or less than 1,500 kg/mol, and a density of equal to or more than 910 kg/m$^3$ to equal to or less than 975 kg/m$^3$, wherein the weight average molecular weight Mw of the first polyethylene resin (A) is lower than the weight average molecular weight Mw of the polyethylene fraction (A-1);

ii) blending the first polyethylene resin (A) with a second polyethylene resin (B) having a weight average molecular weight Mw of equal to or more than 50 kg/mol to less than 500 kg/mol, and a density of equal to or more than 910 kg/m$^3$ to equal to or less than 970 kg/m$^3$ to form said multimodal polyethylene composition, wherein the multimodal polyethylene composition a melt flow rate MFR$_5$ (190° C., 5 kg) of 0.01 to 10 g/10 min and a density of equal to or more than 910 kg/m$^3$ to equal to or less than 970 kg/m$^3$.

The present invention further provides a polyethylene resin (A) comprising a polyethylene fraction (A-1) having a weight average molecular weight Mw of equal to or more than 500 kg/mol to equal to or less than 10,000 kg/mol and a density of equal to or more than 915 kg/m$^3$ to equal to or less than 960 kg/m$^3$ and a polyethylene fraction (A-2) having a lower weight average molecular weight Mw as polyethylene fraction (A-1) and a density of equal to or more than 910 kg/m$^3$ to equal to or less than 975 kg/m$^3$, wherein the polyethylene resin (A) has a weight average molecular weight Mw of equal to or more than 150 kg/mol to equal to or less than 1,500 kg/mol, and a density of equal to or more than 910 kg/m$^3$ to equal to or less than 975 kg/m$^3$, wherein the weight average molecular weight Mw of the polyethylene resin (A) is lower than the weight average molecular weight Mw of the polyethylene fraction (A-1).

In a further aspect the present invention provides a polyethylene composition obtainable by a process comprising the following steps:
i) polymerizing a polyethylene fraction (A-1) having a weight average molecular weight Mw of equal to or more than 500 kg/mol to equal to or less than 10,000 kg/mol and a density of equal to or more than 915 kg/m$^3$ to equal to or less than 960 kg/m$^3$ in one reaction step and polymerizing a polyethylene fraction (A-2) having a lower weight average molecular weight Mw as polyethylene fraction (A-1) and a density of equal to or more than 910 kg/m$^3$ to equal to or less than 975 kg/m$^3$ in a second reaction step of a sequential multistage process wherein one of said polyethylene fractions is polymerized in the presence of the other of said polyethylene fractions to form a first polyethylene resin (A) having a weight average molecular weight Mw of equal to or more than 150 kg/mol to equal to or less than 1,500 kg/mol, and a density of equal to or more than 910 kg/m$^3$ to equal to or less than 975 kg/m$^3$, wherein the weight average molecular weight Mw of the first polyethylene resin (A) is lower than the weight average molecular weight Mw of the polyethylene fraction (A-1),
ii) blending the first polyethylene resin (A) with a second polyethylene resin (B) having a weight average molecular weight Mw of equal to or more than 50 kg/mol to less than 500 kg/mol, and a density of equal to or more than 910 kg/m$^3$ to equal to or less than 970 kg/m$^3$ to form said multimodal polyethylene composition,
wherein the multimodal polyethylene composition a melt flow rate MFR$_5$ (190° C., 5 kg) of 0.01 to 10 g/10 min and a density of equal to or more than 910 kg/m$^3$ to equal to or less than 970 kg/m$^3$.

Finally, the present invention provides the use of the multimodal polyethylene composition according to any of these aspects for the production of an article. In one embodiment this article is a pipe.

DETAILED DESCRIPTION OF THE INVENTION

Definitions

A polyethylene composition according to the present invention denotes a polymer derived from at least 50 mol-% ethylene monomer units and additional comonomer units.

The term 'homopolymer' thereby denotes a polymer consisting essentially of ethylene monomer units. Due to the requirements of large-scale polymerization it may be possible that the ethylene homopolymer includes minor amounts of additional comonomer units, which usually are below 0.05 mol %, preferably below 0.01 mol % of the ethylene homopolymer. Accordingly, the term 'copolymer' denotes a polymer derived from ethylene monomer units and additional comonomer units in an amount of more than 0.05 mol %.

Usually, a polyethylene composition comprising at least two polyethylene fractions, which have been produced under different polymerisation conditions resulting in different (weight average) molecular weights for the fractions, is referred to as "multimodal". The prefix "multi" relates to the number of different polymer fractions of the composition consists of. Thus, for example, a composition consisting of two fractions only is called "bimodal", whereas a composition consisting of three fractions is called "trimodal".

The ultra-high molecular weight (UHMW) fraction of the polyethylene composition is the fraction having a weight average molecular weight Mw of 700 kg/mol to 10,000 kg/mol.

The term 'base resin' denotes the polymeric part of the composition without fillers such as carbon black. A person skilled in the art will understand that the measurements as to the base resin require the presence of stabilizers.

In addition to the base resin, usual additives for utilization with polyolefins, such as pigments (e.g. carbon black), stabilizers (e.g. antioxidant agents), antacids and/or anti-UV's, antistatic agents and utilization agents (such as processing aid agents) may be present in the polyethylene composition.

Preferably, the amount of these additives is 10 wt % or below, more preferably 8 wt % or below, most preferably 5 wt % or below, of the composition.

Preferably, the composition comprises carbon black in an amount of 8 wt % or below, more preferably in an amount of 1 to 4 wt %, of the total composition.

Further preferred, the amount of additives different from carbon black is 1 wt % or less, more preferably 0.5 wt % or less.

The term "blending" denotes any method for admixing components of the polyethylene composition such as polyethylene components and additives. Suitable blending methods are in situ blending, such as polymerizing one polyethylene compound in the presence of another polyethylene compound, or mechanical blending, such as dry blending of solid compounds such as powders and/or pellets, melt blending of liquid compounds such as melts of polyethylene compounds or blending of a liquid compound with a solid compound. Devices for these blending methods are known in the art.

An extruder is denoted as small if the temperature of the melt in the extruder effectively could be influenced by the extruder barrel temperatures by heat conduction, i.e. by external heating or cooling of the barrel.

General Process

Polymerization of polyethylene resin (A) is conducted by polymerizing polyethylene fractions (A-1) and (A-2) at different stages of a multi-stage polymerization process.

A multi-stage polymerization process denotes a process in which a polymer comprising two or more fractions is produced by polymerizing each of the at least two polymer fractions in a separate reaction stage, usually with different reaction conditions in each stage which comprises a polymerization catalyst. The polymerization is preferably followed by a compounding step.

It is preferred that the fractions (A-1) and (A-2) are polymerized at different stages of the multi-stage process in any order. It is thereby preferred that the fractions (A-1) and (A-2) are polymerized in subsequent stages.

It is preferred that the polyethylene resin (A) is polymerized in at least two slurry phase reactors.

In a preferred embodiment both fractions (A-1) and (A-2) are polymerized in slurry phase reactors, preferably loop reactors, in any order.

In any order denotes that there is no preferred order in which the subsequent polymerization stages of the multi-stage process are arranged.

In one preferred embodiment of the process according to the invention, fraction (A-1) is polymerized in the first reaction stage.

It is thereby preferred that fraction (A-2) is polymerized in the second reaction stage in the presence of fraction (A-1).

Preferably, the multistage process consists of two subsequent reaction stages both conducted in slurry phase reactors. Optionally, the first reaction stage is thereby preceded by a prepolymerization stage.

In slurry phase polymerisation the polymer particles formed in the polymerisation together with the catalyst fragmented and dispersed within the particles, are suspended in fluid hydrocarbon. The slurry phase is agitated to enable the transfer of reactants from the fluid into the particles.

The polymerisation in the slurry phase reactor usually takes place in an inert diluent, typically a hydrocarbon diluent which is selected from a group comprising $C_3$ to $C_8$ hydrocarbons, such as methane, ethane, propane, n-butane, isobutane, hexanes such as n-hexane, heptanes, octanes etc. or their mixtures. Preferably the diluent is a low boiling hydrocarbon having from 1 to 4 carbon atoms or a mixture of such hydrocarbons. An especially preferred diluent is propane, possibly containing minor amounts of methane, ethane and/or butane. The inert diluent can be the same or different in the different polymerisation steps.

Polymerization of Polyethylene Fraction (A-1)

For the polymerization of the polyethylene fraction (A-1) the ethylene content in the fluid phase of the slurry in the slurry phase reactor may be from 0.5 to 50% by mole, preferably from 1 to 20% by mole, and in particular from 2 to 10% by mole. The benefit of having a high ethylene concentration is that the productivity of the catalyst is increased but the drawback is that more ethylene then needs to be recycled than if the concentration was lower.

In addition to ethylene monomer it is possible to use one or more alpha-olefin comonomers in the slurry phase polymerisation for producing polyethylene fraction (A-1) if desired. Suitable comonomers are, for example, 1-butene, 1-hexene, 4-methyl-1-pentene, 1-octene and their mixtures.

The molecular weight of the polyethylene fraction (A-1) may be controlled by hydrogen as it is known in the art. Further, antistatic additives may be used to prevent the particles from adhering to each other or the walls of the reactor, as disclosed in WO-A-96/19503 and WO-A-96/32420.

The temperature in the slurry phase polymerisation is typically from 30 to 100° C., preferably from 35 to 100° C. and in particular from 40 to 90° C. The pressure is typically from 1 to 150 bar, preferably from 1 to 100 bar.

The slurry phase polymerisation may be conducted in any known reactor used for slurry phase polymerisation. Such reactors include a continuous stirred tank reactor and a loop reactor. It is especially preferred to conduct the polymerisation in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479 186 and U.S. Pat. No. 5,391,654.

The slurry may be withdrawn from the slurry phase reactor either continuously or intermittently. A preferred way of intermittent withdrawal is the use of settling legs where the slurry is allowed to concentrate before withdrawing a batch of the concentrated slurry from the reactor. The use of settling legs is disclosed, amongst others, in U.S. Pat. Nos. 3,374,211, 3,242,150 and EP-A-1 310 295. Continuous withdrawal is disclosed, amongst others, in EP-A-891 990, EP-A-1 415 999, EP-A-1 591 460 and WO-A-2007/025640. The continuous withdrawal is advantageously combined with a suitable concentration method as disclosed in EP-A-1 415 999 and EP-A-1 591 460.

Settling legs are used to concentrate the slurry that is withdrawn from the reactor. The withdrawn stream thus contains more polymer per volume than the slurry within the reactor in average. This has the benefit that less liquid needs to be recycled back to the reactor and thereby the costs of the equipment are lower. In commercial scale plants the fluid which is withdrawn with the polymer evaporates in a flash tank and from there it is compressed with a compressor and recycled into the slurry phase reactor.

However, the settling legs withdraw the polymer intermittently. This causes the pressure and also other variables in the reactor to fluctuate with the period of the withdrawal. Also the withdrawal capacity is limited and depends on the size and number of settling legs. To overcome these disadvantages continuous withdrawal is often preferred.

The continuous withdrawal, on the other hand, has the problem that it typically withdraws the polymer in the same concentration as it is present within the reactor. To reduce the amount of hydrocarbons to be compressed the continuous outlet is advantageously combined with a suitable concentration device, such as a hydrocyclone or sieve, as disclosed in EP-A-1 415 999 and EP-A-1 591 460. The polymer-rich stream is then directed to a flash and the polymer-lean steam is returned directly into the reactor.

Polymerization of Polyethylene Fraction (A-2)

For the polymerization of the polyethylene fraction (A-2) the ethylene content in the fluid phase of the slurry in the slurry phase reactor may be from 0.5 to 50% by mole, preferably from 1 to 20% by mole, and in particular from 2 to 10% by mole. The benefit of having a high ethylene concentration is that the productivity of the catalyst is increased but the drawback is that more ethylene then needs to be recycled than if the concentration was lower.

In addition to ethylene monomer it is possible to use one or more alpha-olefin comonomers in the slurry phase polymerisation for producing polyethylene fraction (A-2) if desired. Suitable comonomers are, for example, 1-butene, 1-hexene, 4-methyl-1-pentene, 1-octene and their mixtures.

The molecular weight of the polyethylene fraction (A-2) may be controlled by hydrogen as it is known in the art. Further, antistatic additives may be used to prevent the particles from adhering to each other or the walls of the reactor, as disclosed in WO-A-96/19503 and WO-A-96/32420.

The temperature in the slurry phase polymerisation is typically from 50 to 115° C., preferably from 60 to 110° C. and in particular from 70 to 100° C. The pressure is typically from 1 to 150 bar, preferably from 1 to 100 bar.

The slurry phase polymerisation may be conducted in any known reactor used for slurry phase polymerisation. Such reactors include a continuous stirred tank reactor and a loop reactor. It is especially preferred to conduct the polymerisation in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479 186 and U.S. Pat. No. 5,391,654.

It is sometimes advantageous to conduct the slurry phase polymerisation above the critical temperature and pressure of the fluid mixture. Such operations are described in U.S. Pat. No. 5,391,654. In such an operation the temperature is typically at least 85° C., preferably at least 90° C. Furthermore the temperature is typically not higher than 110° C., preferably not higher than 105° C. The pressure under these conditions is typically at least 40 bar, preferably at least 50 bar. Furthermore, the pressure is typically not higher than 150 bar, preferably not higher than 100 bar. In a preferred embodiment the slurry phase polymerization step, is carried out under supercritical conditions whereby the reaction temperature and reaction pressure are above equivalent critical points of the mixture formed by hydrocarbon medium, monomer, hydrogen and optional comonomer and the polymerization temperature is lower than the melting temperature of the polymer formed.

The slurry may be withdrawn from the slurry phase reactor either continuously or intermittently. A preferred way of intermittent withdrawal is the use of settling legs where the slurry is allowed to concentrate before withdrawing a batch of the concentrated slurry from the reactor. The use of settling legs is disclosed, amongst others, in U.S. Pat. Nos. 3,374,211, 3,242,150 and EP-A-1 310 295. Continuous withdrawal is disclosed, amongst others, in EP-A-891 990, EP-A-1 415 999, EP-A-1 591 460 and WO-A-2007/025640. The continuous withdrawal is advantageously combined with a suitable concentration method as disclosed in EP-A-1 415 999 and EP-A-1 591 460.

Settling legs are used to concentrate the slurry that is withdrawn from the reactor. The withdrawn stream thus contains more polymer per volume than the slurry within the reactor in average. This has the benefit that less liquid needs to be recycled back to the reactor and thereby the costs of the equipment are lower. In commercial scale plants the fluid which is withdrawn with the polymer evaporates in a flash tank and from there it is compressed with a compressor and recycled into the slurry phase reactor.

However, the settling legs withdraw the polymer intermittently. This causes the pressure and also other variables in the reactor to fluctuate with the period of the withdrawal. Also the withdrawal capacity is limited and depends on the size and number of settling legs. To overcome these disadvantages continuous withdrawal is often preferred.

The continuous withdrawal, on the other hand, has the problem that it typically withdraws the polymer in the same concentration as it is present within the reactor. To reduce the amount of hydrocarbons to be compressed the continuous outlet is advantageously combined with a suitable concentration device, such as a hydrocyclone or sieve, as disclosed in EP-A-1 415 999 and EP-A-1 591 460. The polymer-rich stream is then directed to a flash and the polymer-lean steam is returned directly into the reactor.

The polymerisation is conducted in the presence of an olefin polymerisation catalyst. The catalyst may be any catalyst which is capable of producing the desired ethylene polymer. Suitable catalysts are, among others, Ziegler-Natta catalysts based on a transition metal, such as titanium, zirconium and/or vanadium or metallocene catalysts or late transition metal catalysts. Especially Ziegler-Natta catalysts and metallocene catalysts are useful as they can produce polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

Another especially suitable catalyst is a silica supported catalyst having a molar composition of the catalyst including Al: 1.30 to 1.65 mol/kg silica, Mg: 1.25 to 1.61 mol/kg silica, and Ti: 0.70 to 0.90 mol/kg silica.

The average particle size of the silica support can be typically from 10 to 100 µm. However, it has turned out that special advantages can be obtained if the support has an average particle size from 5 to 30 µm, preferably from 8 to 25 µm. Alternatively, the support may have an average particle size of from 30 a 80 µm, preferably from 30 to 50 µm. Examples of suitable support materials are, for instance, ES747JR produced and marketed by Ineos Silicas (former Crossfield), and SP9-491, produced and marketed by Grace.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another, especially preferred, group of suitable Ziegler-Natta catalysts contain a titanium compound together with a magnesium halide compound without an inert support. Thus, the catalyst contains a titanium compound on a magnesium dihalide, like magnesium dichloride. Such catalysts are disclosed, for instance, in WO-A-2005/118655 and EP-A-810235.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethyl-aluminium, tri-isobutylaluminium, trihexylaluminium and tri-n-octyl-aluminium. Furthermore they include alkylaluminium oxy-compounds, such as methylaluminiumoxane, hexaisobutylaluminiumoxane and tetraisobutyl-aluminiumoxane. Also other aluminium alkyl compounds, such as iso-prenylaluminium, may be used. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

The catalyst system can be fed to any polymerisation stage but preferably is fed to the first polymerisation stage. Most preferably the catalyst system is only fed to the first polymerisation stage. The catalyst may be transferred into the polymerisation zone by any means known in the art. It is thus possible to suspend the catalyst in a diluent and maintain it as homogeneous slurry. Especially preferred is to use oil having a viscosity from 20 to 1500 mPa*s as diluent, as disclosed in WO-A-2006/063771. It is also possible to mix the catalyst with a viscous mixture of grease and oil and feed the resultant paste into the polymerisation zone. Still further, it is possible to let the catalyst settle and introduce portions of thus obtained catalyst mud into the polymerisation zone in a manner as disclosed, for instance, in EP-A-428 054.

The reaction conditions in the multistage polymerization process are adapted as such that the weight ratio of said polyethylene fraction (A-1) to said polyethylene fraction (A-2) in said first polyethylene resin is preferably from 1:99 to 99:1, more preferably from 5:95 to 90:10, most preferably from 10:90 to 80:20.

The process may further comprise a pre-polymerisation step which precedes the polymerisation steps. The purpose of the pre-polymerisation is to polymerise a small amount of polymer onto the catalyst at a low temperature and/or a low monomer concentration. By pre-polymerisation it is possible to improve the performance of the catalyst in slurry and/or modify the properties of the final polymer. The pre-polymerisation step may be conducted in slurry or gas phase. Preferably the pre-polymerisation is conducted in slurry.

Thus, the pre-polymerisation step may be conducted in a loop reactor. The pre-polymerisation is then preferably conducted in an inert diluent, typically a hydrocarbon diluent such as methane, ethane, propane, n-butane, isobutene, pentanes, hexanes, heptanes, octanes etc., or their mixtures. Preferably the diluent is a low boiling hydrocarbon having from 1 to 4 carbon atoms or a mixture of such hydrocarbons. The most preferred diluent is propane.

The temperature in the pre-polymerisation step is typically from 0° C. to 90° C., preferably from 20° C. to 80° C. and more preferably from 40° C. to 70° C.

The pressure is not critical and is typically from 1 bar to 150 bar, preferably from 10 bar to 100 bar.

The amount of monomer is typically such that from 0.1 grams to 1000 grams of monomer per one gram solid catalyst component is polymerised in the pre-polymerisation step. As the person skilled in the art knows, the catalyst particles recovered from a continuous pre-polymerisation reactor do not all contain the same amount of pre-polymer. Instead, each particle has its own characteristic amount which depends on the residence time of that particle in the pre-polymerisation reactor. As some particles remain in the reactor for a relatively long time and some for a relatively short time, then also the amount of pre-polymer on different particles is different and some individual particles may contain an amount of pre-polymer which is outside the above limits. However, the average amount of pre-polymer on the catalyst typically is within the limits specified above.

In addition to ethylene monomer it is possible to use one or more alpha-olefin comonomers in the pre-polymerisation step if desired. Suitable comonomers are, for example, 1-butene, 1-hexene, 4-methyl-1-pentene, 1-octene and their mixtures.

The molecular weight of the pre-polymer may be controlled by hydrogen as it is known in the art. Further, antistatic additives may be used to prevent the particles from adhering to each other or the walls of the reactor, as disclosed in WO-A-96/19503 and WO-A-96/32420.

The catalyst components are preferably all introduced to the pre-polymerisation step. However, where the solid catalyst component and the cocatalyst can be fed separately it is possible that only a part of cocatalyst is introduced into the pre-polymerisation stage and the remaining part into the subsequent polymerisation stages. Also in such cases it is necessary to introduce as much cocatalyst into the pre-polymerisation stage as necessary to obtain a sufficient polymerisation reaction.

The polyethylene resin (A) preferably is produced in a multi-stage process which further comprises a compounding step, wherein the base resin, which is typically obtained as a base resin powder from the reactor, is extruded in an extruder and then pelletized to polymer pellets in a manner known in the art to form the polyolefin composition of the invention.

Optionally, additives or other polymer components can be added to the composition during the compounding step in an amount as described above. Preferably, the polyethylene resin (A) obtained from the reactor is compounded in the extruder together with additives in a manner known in the art.

The extruder may be e.g. any conventionally used extruder. As an example of an extruder for the present compounding step may be those supplied by Coperion, Japan Steel works, Kobe Steel or Farrel-Pomini.

The set point for the barrel temperature in the extruder is preferably from 150° C. to 220° C., more preferably from 160° C. to 210° C. and most preferably from 170° C. to 200° C. For small extruders and also for large extruders during the start-up the barrels are typically heated, for instance, by electric bands. However, as it is well understood by the person skilled in the art large extruders generally operate adiabatically and then the barrel temperatures are not controlled.

The throughput is selected based on the desired production volume. As the person skilled in the art understands greater throughput can be achieved by extruders having a greater diameter. Useful scale-up principles for mixing is presented, among others, in Rauwendaal, Polymer Extrusion, Hanser Publishers, Munich, 1986 (ISBN 3-446-14196-0), in Table 8-4 on page 439. It shows that the ratio of the output rates is directly proportional to the cube of the ratio of the diameters.

$$\dot{V}_2 = \dot{V}_1 \cdot \left(\frac{D_2}{D_1}\right)^3$$

where $V_2$ and $D_2$ are the output rate and diameter of the large extruder and $V_1$ and $D_1$ are output rate and the diameter of the small extruder.

For small laboratory and pilot scale extruders throughput within a range of from about 1 up to about 200 kg/h would be appropriate and for large production scale extruders the throughput could be from about 300 up to about 20,000 kg/h.

In one embodiment of the process according to the invention the first polyethylene resin (A) is pelletized prior to blending with the second polyethylene resin (B) to form the polyethylene composition.

In another embodiment of the process according to the invention the first polyethylene resin (A) is blended in powder form with the second polyethylene resin (B) to form the polyethylene composition.

In both ways the resultant multimodal polyethylene composition shows an improved homogeneity. However, it has been found that by pelletizing the polyethylene resin (A) prior to blending with the second polyethylene resin (B) the homogeneity of the resultant multimodal polyethylene composition is even further improved.

Blending of the First Polyethylene Resin (A) and the Second Polyethylene Resin (B)

In the process according to the invention the first polyethylene resin (A) is blended in a blending step, preferably mechanical blending step, with the second polyethylene resin (B) to form the polyethylene composition.

The weight ratio of the first polyethylene resin (A) to with the second polyethylene resin (B) in the polyethylene composition is preferably from 2:98 to 40:60, more preferably from 3:97 to 30:70, most preferably from 4:96 to 20:80.

Preferably, the polyethylene composition is formed by melt blending of the first polyethylene resin (A) and the second polyethylene resin (B).

Thereby, polyethylene resins (A) and (B) can be fed to the melt blending device as pellets or as powder. Preferably, resin (A) is introduced as pellets. In most cases it is convenient to introduce resin (B) as powder.

The melt blending device can have at least two feeding zones. In this configuration a second feeding zone is preferably situated downstream of the first feeding zone.

Preferably, both resins (A) and (B) are introduced in the first feeding zone.

To either one or both of the feeding zones additives as defined above can be added.

It is more preferred to dry-blend the polyethylene resins (A) and (B) and introduce said dry-blend via one feeding zone into the melt-blending device.

During dry-blending of the polyethylene resins (A) and (B) additives as defined above can be added.

Suitable melt blending devices are mixers or extruders. Especially suitable are twin screw extruders such as e.g. Coperion ZSK twin screw extruder.

The set point for the barrel temperature in the extruder is preferably from 150° C. to 250° C., more preferably from 170° C. to 230° C. and most preferably from 200° C. to 220° C. For small extruders and also for large extruders during the start-up the barrels are typically heated, for instance, by electric bands. However, as it is well understood by the person skilled in the art large extruders generally operate adiabatically and then the barrel temperatures cannot be controlled.

The screw speed in the extruder is preferably from 100 min$^{-1}$ to 200 min$^{-1}$, more preferably 120 min$^{-1}$ to 180 min$^{-1}$.

Again, the throughput is set by the desired production volume. For scale-up purposes the discussion given for the first homogenisation device is valid also for the second homogenisation device.

Preferably the polyethylene composition exiting the melt blending device is pelletized before storage.

The different components of the polyethylene composition according to the invention and obtainable according to the process according to the invention as characterized as follows:

Polyethylene Resin (A)

The polyethylene resin (A) comprises polyethylene fractions (A-1) and (A-2) which are blended according to the process of the invention.

Polyethylene resin (A) can be an ethylene homo- or copolymer.

The polyethylene resin (A) can be a copolymer of ethylene with at least one alpha-olefin comonomer unit. The alpha-olefin comonomer unit preferably is selected from alpha-olefin co-monomer units with 3 to 12 carbon atoms, more preferably 4 to 8 carbon atoms. Suitable alpha-olefin comonomer units are 1-butene, 1-hexene and 1-octene. Thereby, 1-butene and 1-hexene are most preferred.

Preferably, the base resin of the polyethylene resin (A) consists of the polyethylene fractions (A-1) and (A-2).

The weight ratio of polyethylene fraction (A-1) to polyethylene fraction (A-2) in the polyethylene resin (A) is preferably from 1:99 to 99:1, more preferably from 5:95 to 90:10, most preferably from 10:90 to 80:20.

Polyethylene resin (A) can comprise additives as defined above.

Polyethylene resin (A) is characterized by the following properties:

Mw

Polyethylene resin (A) has a weight average molecular weight Mw of 150 kg/mol to 1,500 kg/mol, preferably from 200 kg/mol to 1,200 kg/mol, most preferably from 230 kg/mol to 1,000 kg/mol, determined by GPC.

Compared to the Mw of polyethylene fraction (A-1) polyethylene resin (A) has a lower Mw.

Mn

Polyethylene resin (A) preferably has a number average molecular weight Mn of 1.0 kg/mol to 20 kg/mol, preferably from 2 kg/mol to 15 kg/mol, most preferably from 3 kg/mol to 12 kg/mol, determined by GPC.

Mz

Polyethylene resin (A) preferably has a z average molecular weight Mz of 1,800 kg/mol to 4,500 kg/mol, preferably from 2,000 kg/mol to 4,000 kg/mol, most preferably from 2,100 kg/mol to 3,500 kg/mol, determined by GPC.

MFR$_5$

Polyethylene resin (A) can have a rather broad range of MFR$_5$. Preferably polyethylene resin (A) has a melt flow rate MFR$_5$ (190° C., 5 kg) of at most 50 g/10 min, more preferably of at most 45 g/10 min, and most preferably at most 40 g/10 min determined according to ISO 1133.

Density

Polyethylene resin (A) has a density of equal to or more than 910.0 kg/m$^3$ and equal to or less than 975.0 kg/m$^3$, more preferably of equal to or more than 912.0 kg/m$^3$ and equal to or less than 974.0 kg/m$^3$, and most preferably of equal to or more than 915.0 kg/m$^3$ and equal to or less than 974.0 kg/m$^3$ determined according to ISO 1183-1:2004.

White Spot Rating (WSR)

Polyethylene resin (A) preferably has a rating in the ISO 18553:2002 white spot rating test of 1.3 to 5.0, more preferably of 2.0 to 4.5.

Polyethylene Fraction (A-1)

Polyethylene fraction (A-1) may be a homopolymer of ethylene or a copolymer of ethylene and one or more alpha-olefins having from 4 to 20, preferably 4 to 10 carbon atoms. Preferably, polyethylene fraction (A-1) is a homopolymer of ethylene.

Polyethylene Fraction (A-1) is Characterized by the Following Properties:

Mw

Polyethylene fraction (A-1) has a weight average molecular weight Mw of 500 kg/mol to 10,000 kg/mol, preferably from 700 kg/mol to 5,000 kg/mol, most preferably from 1,000 kg/mol to 2,500 kg/mol, determined by GPC.

Density

Polyethylene fraction (A-1) has a density of equal to or more than 915.0 kg/m$^3$ and equal to or less than 960.0 kg/m$^3$, more preferably of equal to or more than 920.0 kg/m$^3$ and equal to or less than 950.0 kg/m$^3$, and most preferably of equal to or more than 930.0 kg/m$^3$ and equal to or less than 940.0 kg/m$^3$ determined according to ISO 1183-1:2004.

Polyethylene Fraction (A-2)

Polyethylene fraction (A-2) can be a unimodal or multimodal ethylene homo- or copolymer.

It is preferred that the polyethylene fraction (A-2) is unimodal.

The polyethylene fraction (A-2) can be a copolymer of ethylene with at least one alpha-olefin comonomer unit. The alpha-olefin comonomer unit preferably is selected from alpha-olefin co-monomer units with 3 to 12 carbon atoms, more preferably 4 to 8 carbon atoms. Suitable alpha-olefin comonomer units are 1-butene, 1-hexene and 1-octene. Thereby, 1-butene and 1-hexene are most preferred.

Polyethylene fraction (A-2) has a density of equal to or more than 910.0 kg/m$^3$ and equal to or less than 975.0 kg/m$^3$, more preferably of equal to or more than 915.0 kg/m$^3$ to equal to or less than 974.5 kg/m$^3$ and most preferably of equal to or more than 920.0 kg/m$^3$ to equal to or less than 974.0 kg/m$^3$ determined according to ISO 1183-1:2004.

Polyethylene fraction (A-2) has a lower weight average molecular weight Mw than polyethylene fraction (A-1). Preferably, the weight average molecular weight Mw of the polyethylene fraction (A-2) is from 5 to 500 kg/mol, more preferably from 10 to 400 kg/mol and even more preferably from 15 to 300 kg/mol.

Polyethylene Resin (B)

Polyethylene resin (B) can be a unimodal or multimodal ethylene homo- or copolymer.

It is preferred that the polyethylene resin (B) is multimodal.

Preferably, the polyethylene resin (B) is a copolymer of ethylene with at least one alpha-olefin comonomer unit. The alpha-olefin comonomer unit preferably is selected from alpha-olefin co-monomer units with 3 to 12 carbon atoms, more preferably 4 to 8 carbon atoms. Suitable alpha-olefin comonomer units are 1-butene, 1-hexene and 1-octene. Thereby, 1-butene and 1-hexene are most preferred.

Polyethylene resin (B) can comprise additives as defined above.

Mw

Polyethylene resin (B) has a weight average molecular weight Mw of 50 kg/mol to less than 500 kg/mol, preferably from 70 kg/mol to 400 kg/mol, most preferably from 100 kg/mol to 300 kg/mol, determined by GPC.

MFR$_5$

Polyethylene resin (B) preferably has a melt flow rate MFR$_5$ (190° C., 5 kg) of 0.01 to 5.0 g/10 min, more preferably of 0.05 to 4.0 g/10 min, and most preferably 0.1 to 3.0 g/10 min determined according to ISO 1133.

Density

Polyethylene resin (B) has a density of equal to or more than 910.0 kg/m$^3$ and equal to or less than 970.0 kg/m$^3$, more preferably of equal to or more than 915.0 kg/m$^3$ and equal to or less than 960.0 kg/m$^3$, and most preferably of equal to or more than 920.0 kg/m$^3$ and equal to or less than 955.0 kg/m$^3$ determined according to ISO 1183-1:2004.

Polymerization

Polyethylene resin (B) is usually made by a multi-stage process, i.e. a process which makes use of at least two reactors, one for producing a lower molecular weight component and a second for producing a higher molecular weight component. These reactors may be employed in parallel, in which case the components must be mixed after production. More commonly, the reactors are employed in series, such that the products of one reactor are used as the starting material in the next reactor, e.g. one component is formed in the first reactor and the second is formed in the second reactor in the presence of the first component. In this way, the two components are more intimately mixed, since one is formed in the presence of the other.

The polymerization reactions used in each stage may involve conventional ethylene homo-polymerization or copolymerization reactions, e.g. gas phase, slurry phase, liquid phase polymerizations, using conventional reactors, e.g. loop reactors, gas phase reactors, batch reactors, etc.

The polymerization may be carried out continuously or batchwise, preferably the polymerization is carried out continuously.

Known two-stage processes are for instance liquid phase-liquid phase processes, gas phase-gas phase processes and liquid phase-gas phase processes. It is also known that these two-stage processes can further be combined with one or more additional polymerization steps selected from gas phase, slurry phase or liquid phase polymerization processes.

Polyethylene resin (B) is preferably produced in a multistage process, where lower molecular weight and higher molecular weight polymers (components) are produced in different polymerization steps, in any order.

The polymerisation is conducted in the presence of an olefin polymerisation catalyst. The catalyst may be any catalyst which is capable of producing the desired ethylene polymer. Suitable catalysts are, among others, Ziegler-Natta catalysts based on a transition metal, such as titanium, zirconium and/or vanadium or metallocene catalysts or late transition metal catalysts. Especially Ziegler-Natta catalysts and metallocene catalysts are useful as they can produce polymers within a wide range of molecular weight with a high productivity.

Suitable Ziegler-Natta catalysts preferably contain a magnesium compound, an aluminium compound and a titanium compound, optionally supported on a particulate support.

Polyethylene Composition

The multimodal polyethylene composition according to the invention comprises polyethylene resins (A) and (B) which are blended according to the process of the invention.

Preferably, the base resin of the composition consists of the polyethylene resins (A) and (B).

The composition can comprise additives as defined above.

The weight ratio of the first polyethylene resin (A) to with the second polyethylene resin (B) in the polyethylene composition is preferably from 2:98 to 40:60, more preferably from 3:97 to 30:70, most preferably from 4:96 to 20:80.

Preferably the amount of polyethylene fraction (A-1) in the polyethylene composition is 0.5 to 36 wt %, more preferably 1.0 to 30 wt %, more preferably 1.5 to 25 wt %, still more preferably 1.8 to 20.0 wt %, and most preferably 2.0 to 18.0 wt % of the total polyethylene composition The polyethylene composition is characterized by the following properties:

Mw

The multimodal polyethylene composition preferably has a weight average molecular weight Mw of 100 kg/mol to 500 kg/mol, preferably from 150 kg/mol to 400 kg/mol, most preferably from 200 kg/mol to 350 kg/mol, determined by GPC.

Mz

The multimodal polyethylene composition preferably has a z average molecular weight Mz of 1,000 kg/mol to equal to or less than 5,000 kg/mol, preferably from 1,200 kg/mol to 4,000 kg/mol, most preferably from 1,300 kg/mol to 3,000 kg/mol, determined by GPC.

MFR$_5$

The composition according to the present invention has a melt flow rate MFR$_5$ (190° C., 5 kg) of 0.01 to 10.0 g/10 min, preferably of 0.03 to 9.0 g/10 min, and most preferably 0.05 to 8.0 g/10 min determined according to ISO 1133.

MFR$_{21}$

The composition according to the present invention preferably has a melt flow rate MFR$_{21}$ (190° C., 21.6 kg) of 0.5 to 300 g/10 min, preferably of 0.7 to 250 g/10 min, and most preferably of 1.0 to 200 g/10 min determined according to ISO 1133.

Density

The composition according to the present invention has a density of equal to or more than 910.0 kg/m$^3$ and equal to or less than 970.0 kg/m$^3$, preferably of equal to or more than 912.0 kg/m$^3$ and equal to or less than 969.0 kg/m$^3$, and most preferably of equal to or more than 915.0 kg/m$^3$ and equal to or less than 968.0 kg/m$^3$ determined according to ISO 1183-1:2004.

The density of the composition is influenced by the density of the base resin and can further be adjusted by the amount of filler, usually carbon black, in the composition.

The density of the base resin is mainly influenced by the amount and type of comonomer. In addition to that, the nature of the polymer originating mainly from the catalyst used as well as the melt flow rate play a role. In addition to that, it should be stressed that the comonomer does not need to be a single comonomer. Mixtures of comonomers are also possible.

The composition is further characterized by specific rheological properties.

viscosity at a shear stress of 747 Pa, eta$_{747\ Pa}$

The composition according to the present invention preferably has a viscosity at a shear stress of 747 Pa, eta$_{747\ Pa}$, of 500 kPa·s or more, more preferably of 550 kPa·s or more and most preferably of 500 kPa·s or more. The upper limit is usually not higher than 2000 kPa·s or less.

Viscosities determined at low shear rates such as eta$_{747\ Pa}$ are a measure for the molecular weight of a polyethylene composition as they are directly proportional with the weight average molecular weight Mw. A high value of eta$_{747\ Pa}$ thus shows a high amount of long polyethylene chains in the composition and thus can be seen as a measure of degradation.

White Spot Rating (WS)

The polyethylene composition according to the present invention preferably has a rating in the ISO 18553:2002 white spot rating test of less than 4, more preferably of equal to or less than 3.5, even more preferably of equal to or less than 3.0 and most preferably of equal to or less than 2.5. The lower limit of the white spot rating is usually 0.

The white spot rating test is a measure for the homogeneity of a polyethylene composition. When compounding polyethylene compositions e.g. for producing pipes, so-called "white spots" occur in the compounded material. These white spots usually have a size of below 10 to about 50 micrometer and consist of non-pigmented, high molecular weight polymer agglomerates/particles that have not been adequately dispersed in the composition. These inhomogeneities in polymer compositions may increase roughness of the surface of articles produced thereof and impair their strength properties.

It is known that homogeneity of a multimodal polymer composition can be improved by applying multiple compounding steps and/or particular compounding conditions to the resin coming from the reactor. These measures, however, have the disadvantage that they are associated with a significant increase in production costs for the composition and possibly degradation of the polymer.

Applications

The polyethylene compositions produced according to the present invention are suitable for different applications such as steel pipe coating, high density (HD) pipe applications, film applications, such as linear low density (LLD) films, medium density (MD) films and high density (HD) films, injection moulding applications and cable jacketing. For these different applications the polyethylene composition has the following properties:

Steel Pipe Coating

For steel pipe coating the composition according to the present invention preferably has a melt flow rate MFR$_5$ (190° C., 5 kg) of 0.05 to 5.0 g/10 min, more preferably of 0.1 to 2.5 g/10 min, and most preferably 0.2 to 1.0 g/10 min determined according to ISO 1133.

The composition preferably has a density of equal to or more than 935.0 kg/m$^3$ and equal to or less than 960.0 kg/m$^3$, more preferably of equal to or more than 936.5 kg/m$^3$ and equal to or less than 957.0 kg/m$^3$, and most preferably of equal to or more than 938.0 kg/m$^3$ and equal to or less than 955.0 kg/m$^3$ determined according to ISO 1183-1:2004.

The composition preferably has a weight average molecular weight Mw of 50 kg/mol to 300 kg/mol, more preferably 70 kg/mol to 250 kg/mol, determined by GPC.

LLD Films

For LLD films the composition according to the present invention preferably has a melt flow rate MFR$_5$ (190° C., 5 kg) of 0.5 to 5.0 g/10 min, more preferably of 0.6 to 4.0 g/10 min, and most preferably 0.8 to 3.0 g/10 min determined according to ISO 1133.

The composition preferably has a melt flow rate MFR$_{21}$ (190° C., 21.6 kg) of 10 to 100 g/10 min, preferably of 12 to 80 g/10 min, and most preferably of 15 to 70 g/10 min determined according to ISO 1133.

The composition preferably has a density of equal to or more than 910.0 kg/m$^3$ and equal to or less than 930.0 kg/m$^3$, more preferably of equal to or more than 912.5 kg/m$^3$ and equal to or less than 927.0 kg/m$^3$, and most preferably of equal to or more than 915.0 kg/m$^3$ and equal to or less than 925.0 kg/m$^3$ determined according to ISO 1183-1:2004.

The composition preferably has a weight average molecular weight Mw of 100 kg/mol to 350 kg/mol, more preferably 130 kg/mol to 300 kg/mol, determined by GPC.

MD Films

For MD films the composition according to the present invention preferably a melt flow rate MFR$_{21}$ (190° C., 21.6 kg) of 2.5 to 50 g/10 min, preferably of 3.5 to 40 g/10 min, and most preferably of 5 to 30 g/10 min determined according to ISO 1133.

The composition preferably has a density of equal to or more than 925.0 kg/m$^3$ and equal to or less than 945.0 kg/m$^3$, more preferably of equal to or more than 927.5 kg/m$^3$ and equal to or less than 943.0 kg/m$^3$, and most preferably of equal to or more than 930.0 kg/m$^3$ and equal to or less than 940.0 kg/m$^3$ determined according to ISO 1183-1:2004.

HD Films

For HD films the composition according to the present invention preferably a melt flow rate MFR$_{21}$ (190° C., 21.6 kg) of 2.5 to 20 g/10 min, preferably of 3 to 15 g/10 min, and most preferably of 4 to 10 g/10 min determined according to ISO 1133.

The composition preferably has a density of equal to or more than 940.0 kg/m$^3$ and equal to or less than 970.0 kg/m$^3$, more preferably of equal to or more than 942.0 kg/m$^3$ and equal to or less than 965.0 kg/m$^3$, and most preferably of equal to or more than 945.0 kg/m$^3$ and equal to or less than 960.0 kg/m$^3$ determined according to ISO 1183-1:2004.

Injection Moulding

For injection moulding the composition according to the present invention preferably has a melt flow rate MFR$_2$ (190° C., 2.16 kg) of 0.2 to 4.0 g/10 min, preferably of 0.4 to 3.0 g/10 min, and most preferably 0.2 to 1.0 g/10 min determined according to ISO 1133.

The composition preferably has a melt flow rate $MFR_{21}$ (190° C., 21.6 kg) of 15 to 300 g/10 min, preferably of 20 to 250 g/10 min, and most preferably of 25 to 200 g/10 min determined according to ISO 1133.

The composition preferably has a density of equal to or more than 935.0 kg/m$^3$ and equal to or less than 955.0 kg/m$^3$, more preferably of equal to or more than 936.5 kg/m$^3$ and equal to or less than 952.0 kg/m$^3$, and most preferably of equal to or more than 938.0 kg/m$^3$ and equal to or less than 950.0 kg/m$^3$ determined according to ISO 1183-1:2004.

HD Pipe

For HD pipes the composition according to the present invention preferably has a melt flow rate $MFR_5$ (190° C., 5 kg) of 0.05 to 1.0 g/10 min, more preferably of 0.08 to 0.7 g/10 min, and most preferably 0.1 to 0.4 g/10 min determined according to ISO 1133.

The composition preferably has a density of equal to or more than 945.0 kg/m$^3$ and equal to or less than 965.0 kg/m$^3$, more preferably of equal to or more than 946.5 kg/m$^3$ and equal to or less than 964.0 kg/m$^3$, and most preferably of equal to or more than 948.0 kg/m$^3$ and equal to or less than 963.0 kg/m$^3$ determined according to ISO 1183-1:2004.

MD Pipe

For MD pipes the composition according to the present invention preferably has a melt flow rate $MFR_5$ (190° C., 5 kg) of 0.05 to 1.0 g/10 min, more preferably of 0.08 to 0.7 g/10 min, and most preferably 0.2 to 0.6 g/10 min determined according to ISO 1133.

The composition preferably has a density of equal to or more than 930.0 kg/m$^3$ and equal to or less than 945.0 kg/m$^3$, more preferably of equal to or more than 930.0 kg/m$^3$ and equal to or less than 940.0 kg/m$^3$ determined according to ISO 1183-1:2004.

Cable Jacketing

For cable jacketing the composition according to the present invention preferably has a melt flow rate $MFR_5$ (190° C., 5 kg) of 0.1 to 3.0 g/10 min, more preferably of 0.2 to 2.5 g/10 min, and most preferably 0.3 to 3.0 g/10 min determined according to ISO 1133.

The composition preferably has a density of equal to or more than 918.0 kg/m$^3$ and equal to or less than 965.0 kg/m$^3$, more preferably of equal to or more than 920.0 kg/m$^3$ and equal to or less than 964.0 kg/m$^3$, and most preferably of equal to or more than 930.0 kg/m$^3$ and equal to or less than 960.0 kg/m$^3$ determined according to ISO 1183-1:2004.

EXAMPLES

Determination Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_5$ of polyethylene is measured at a temperature 190° C. and a load of 5 kg, the $MFR_2$ of polyethylene at a temperature 190° C. and a load of 2.16 kg and the $MFR_{21}$ of polyethylene is measured at a temperature of 190° C. and a load of 21.6 kg. The quantity FRR (flow rate ratio) denotes the ratio of flow rates at different loads. Thus, $FRR_{21/5}$ denotes the value of $MFR_{21}/MFR_5$.

a) Density

Density of the polymer was measured according to ISO 1183-1:2004 Method A on compression moulded specimen prepared according to EN ISO 1872-2 (February 2007) and is given in kg/m$^3$.

b) Comonomer Content

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification. {[1], [2], [6]} Standard single-pulse excitation was employed utilising the transient NOE at short recycle delays of 3s {[1], [3]} and the RS-HEPT decoupling scheme {[4], [5]}. A total of 1024 (1 k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {[9]}.

Characteristic signals corresponding to the incorporation of 1-hexene were observed {[9]} and all contents calculated with respect to all other monomers present in the polymer.

$$H = I_{*B4}$$

With no other signals indicative of other comonomer sequences, i.e. consecutive comonomer incorporation, observed the total 1-hexene comonomer content was calculated based solely on the amount of isolated 1-hexene sequences:

$$H_{total} = H$$

Characteristic signals resulting from saturated end-groups were observed. The content of such saturated end-groups was quantified using the average of the integral of the signals at 22.84 and 32.23 ppm assigned to the 2s and 2s sites respectively:

$$S = (½)*(I_{2S} + I_{3S})$$

The relative content of ethylene was quantified using the integral of the bulk methylene (δ+) signals at 30.00 ppm:

$$E = (½)*I_{δ+}$$

The total ethylene comonomer content was calculated based the bulk methylene signals and accounting for ethylene units present in other observed comonomer sequences or end-groups:

$$E_{total} = E + (5/2)*B + (3/2)*S$$

The total mole fraction of 1-hexene in the polymer was then calculated as:

$$fH = (H_{total}/(E_{total} + H_{total})$$

The total comonomer incorporation of 1-hexene in mole percent was calculated from the mole fraction in the usual manner:

$$H[\text{mol \%}] = 100*fH$$

The total comonomer incorporation of 1-hexene in weight percent was calculated from the mole fraction in the standard manner:

$$H[\text{wt \%}] = 100*(fH*84.16)/((fH*84.16)+((1-fH)*28.05))$$

[1] Klimke, K., Parkinson, M., Piel, C., Kaminsky, W., Spiess, H. W., Wilhelm, M., Macromol. Chem. Phys. 2006; 207:382.
[2] Parkinson, M., Klimke, K., Spiess, H. W., Wilhelm, M., Macromol. Chem. Phys. 2007; 208:2128.
[3] Pollard, M., Klimke, K., Graf, R., Spiess, H. W., Wilhelm, M., Sperber, O., Piel, C., Kaminsky, W., Macromolecules 2004; 37:813.
[4] Filip, X., Tripon, C., Filip, C., J. Mag. Resn. 2005, 176, 239
[5] Griffin, J. M., Tripon, C., Samoson, A., Filip, C., and Brown, S. P., Mag. Res. in Chem. 2007 45, S1, S198
[6] Castignolles, P., Graf, R., Parkinson, M., Wilhelm, M., Gaborieau, M., Polymer 50 (2009) 2373
[7] Zhou, Z., Kuemmerle, R., Qiu, X., Redwine, D., Cong, R., Taha, A., Baugh, D. Winniford, B., J. Mag. Reson. 187 (2007) 225
[8] Busico, V., Carbonniere, P., Cipullo, R., Pellecchia, R., Severn, J., Talarico, G., Macromol. Rapid Commun. 2007, 28, 1128
[9] J. Randall, Macromol. Sci., Rev. Macromol. Chem. Phys. 1989, C29, 201.

c) Rheological Parameters

The characterization of polymer melts by dynamic shear measurements complies with ISO standards 6721-1 and 6721-10. The measurements were performed on an Anton Paar MCR501 stress controlled rotational rheometer, equipped with a 25 mm parallel plate geometry. Measurements were undertaken on compression moulded plates using nitrogen atmosphere and setting a strain within the linear viscoelastic regime. The oscillatory shear tests were done at 190° C. applying a frequency range between 0.01 and 600 rad/s and setting a gap of 1.3 mm.

In a dynamic shear experiment the probe is subjected to a homogeneous deformation at a sinusoidal varying shear strain or shear stress (strain and stress controlled mode, respectively). On a controlled strain experiment, the probe is subjected to a sinusoidal strain that can be expressed by $$\gamma(t) = \gamma_0 \sin(\omega t) \quad (1)$$

If the applied strain is within the linear viscoelastic regime, the resulting sinusoidal stress response can be given by $$\sigma(t) = \sigma_0 \sin(\omega t + \delta) \quad (2)$$

where $\sigma_0$, and $\gamma_0$ are the stress and strain amplitudes, respectively; $\omega$ is the angular frequency; $\delta$ is the phase shift (loss angle between applied strain and stress response); t is the time.

Dynamic test results are typically expressed by means of several different rheological functions, namely the shear storage modulus, G', the shear loss modulus, G", the complex shear modulus, G*, the complex shear viscosity, η*, the dynamic shear viscosity, η', the out-of-phase component of the complex shear viscosity, η" and the loss tangent, tan η, which can be expressed as follows:

$$G' = \frac{\sigma_0}{\gamma_0} \cos\delta \; [\text{Pa}] \quad (3)$$

$$G'' = \frac{\sigma_0}{\gamma_0} \sin\delta \; [\text{Pa}] \quad (4)$$

$$G^* = G' + iG'' \; [\text{Pa}] \quad (5)$$

$$\eta^* = \eta' - i\eta'' \; [\text{Pa}\cdot\text{s}] \quad (6)$$

$$\eta' = \frac{G''}{\omega} \; [\text{Pa}\cdot\text{s}] \quad (7)$$

$$\eta'' = \frac{G'}{\omega} \; [\text{Pa}\cdot\text{s}] \quad (8)$$

The values of storage modulus (G'), loss modulus (G"), complex modulus (G*) and complex viscosity (η*) were obtained as a function of frequency (ω).

Thereby, e.g. $\eta^*_{300rad/s}$ (eta*$_{300rad/s}$) is used as abbreviation for the complex viscosity at the frequency of 300 rad/s and $\eta^*_{0.05rad/s}$ (eta*$_{0.05rad/s}$) is used as abbreviation for the complex viscosity at the frequency of 0.05 rad/s.

The viscosity eta$_{747}$ is measured at a very low, constant shear stress of 747 Pa and is inversely proportional to the gravity flow of the polyethylene composition, i.e. the higher eta$_{747}$ the lower the sagging of the polyethylene composition.

The values are determined by means of a single point interpolation procedure, as defined by Rheoplus software. In situations for which a given G* value is not experimentally reached, the value is determined by means of an extrapolation, using the same procedure as before. In both cases (interpolation or extrapolation), the option from Rheoplus "Interpolate y-values to x-values from parameter" and the "logarithmic interpolation type" were applied.

REFERENCES

[1] Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362
[2] The influence of molecular structure on some rheological properties of polyethylene", Heino, E. L., Borealis Polymers Oy, Porvoo, Finland, Annual Transactions of the Nordic Rheology Society, 1995.).
[3] Definition of terms relating to the non-ultimate mechanical properties of polymers, Pure & Appl. Chem., Vol. 70, No. 3, pp. 701-754, 1998.

d) Molecular Weight

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4: 2003 and ASTM D 6474-99 using the following formulas:

$$M_n = \frac{\sum_{i=1}^{N} A_i}{\sum (A_i / M_i)} \quad (1)$$

$$M_w = \frac{\sum_{i=1}^{N} (A_i \times M_i)}{\sum A_i} \quad (2)$$

-continued $$M_s = \frac{\sum_{i=1}^{N}(A_i \times M_i^2)}{\sum(A_i/M_i)} \quad (3)$$

For a constant elution volume interval $\Delta V_i$, where $A_i$ and $M_i$ are the chromatographic peak slice area and polyolefin molecular weight (MW).

A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at 160° C. under continuous gentle shaking in the autosampler of the GPC instrument.

e) Measure of Homogeneity/White Spot Rating (WSR)

The white spot rating of the compounded composition is determined according to ISO 18 553/2002-03-01 as follows:

Pellets of the composition which are obtained after a single compounding step are analysed by collecting 6 different pellets where from each pellet, one cut is used (thickness cut 20±2 μm). The cut for the measurement of the white spot rating should be taken near the middle of the pellet (sample) with rotation microtome Type Leica RM2265. Preferably, the cut is in flow direction of the melt through the whole of the pelletizer.

The cuts are evaluated at a magnification of 100× and the size and the number of the non-coloured inclusions ("white-spots"=non-pigmented, high molecular weight agglomerates/particles in the polymer) on the total area of each cut are determined. All white spots with a diameter of >5 μm are counted. Transmission light microscope Olympus BX41 with XYZ motorised stage from Märzhäuser and particle inspector Software from Olympus was used.

The white spot rating test "homogeneity" is based on the ISO 18553/2002-03-01. In this test, inhomogeneities of the composition, present after a single compounding step as described above, which appear as white spots, are determined and rated according to the rating scheme given in ISO 18553/2002-03-01. The lower the composition is rated (less amount of high molecular weight particles) in this test, the better is the homogeneity of the composition.

FIGURES

FIG. 1 Microtome cut for evaluating the White Spot Rating of Example 1

Figure 2:
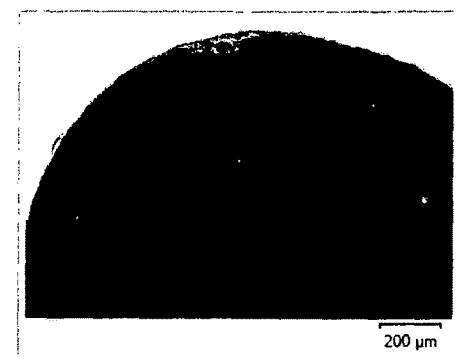

FIG. 2 Microtome cut for evaluating the White Spot Rating of Example 2

Figure 3:
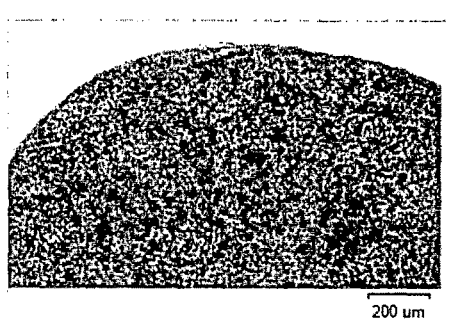

FIG. 3 Microtome cut for evaluating the White Spot Rating of Example 3

Figure 4:
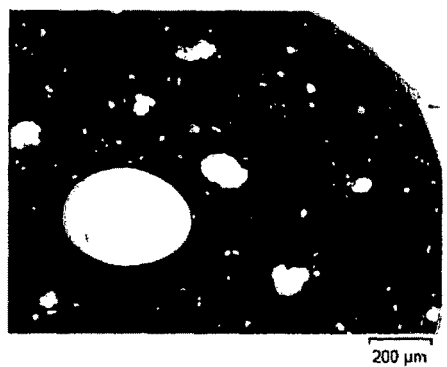

FIG. 4 Microtome cut for evaluating the White Spot Rating of Comparative Example 4

Figure 5:
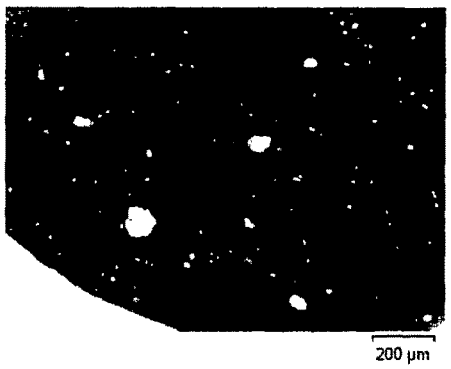

FIG. 5 Microtome cut for evaluating the White Spot Rating of Comparative Example 5

Figure 6:
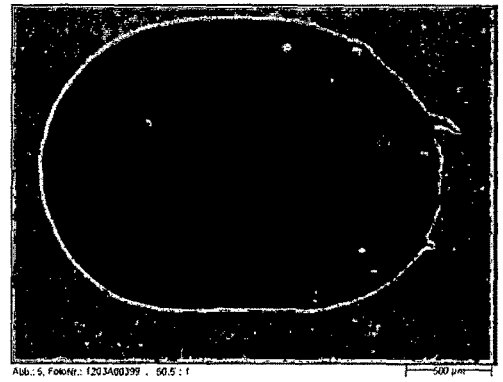

FIG. 6 Microtome cut for evaluating the White Spot Rating of Comparative Example 6

EXAMPLES a) Preparation of the Catalyst

Complex Preparation:

87 kg of toluene were added into the reactor. Then 45.5 kg Bomag A (butyloctyl magnesium) in heptane were also added in the reactor. 161 kg 99.8% 2-ethyl-1-hexanol were then introduced into the reactor at a flow rate of 24 to 40 kg/h. The molar ratio between BOMAG-A and 2-ethyl-1-hexanol was 1:1.83.

Solid Catalyst Component Preparation:

330 kg silica (calcined silica, Sylopol® 2100) and pentane (0.12 kg/kg carrier) were charged into a catalyst preparation reactor. Then EADC (Ethylaluminium dichloride) (2.66 mol/kg silica) was added into the reactor at a temperature of below 40° C. during two hours and mixing was continued for one hour. The temperature during mixing was 40 to 50° C. Then the Mg complex prepared as described above was added (2.56 mol Mg/kg silica) at 50° C. during two hours and mixing was continued at 40 to 50° C. for one hour. 0.84 kg pentane/kg silica was added into the reactor and the slurry was stirred for 4 hours at the temperature of 40 to 50° C. Finally, $TiCl_4$ (1.47 mol/kg silica) was added during at least 1 hour at 55° C. to the reactor. The slurry was stirred at 50 to 60° C. for five hours. The catalyst was then dried by purging with nitrogen.

Molar composition of the ready catalyst component is:

Al/Mg/Ti=1.5/1.4/0.8 (mol/kg silica).

b) Polymerization of In-Situ UHMW Polyethylene Master Batch MB1 for Inventive Example 1 (Ex1)

Into a reactor having a volume of 5.3 L were introduced 850 g propane at the room temperature and 37.6 mg polymerisation catalyst having a solid titanium component prepared according to the procedure presented in point a) above and triethylaluminium as an activator so that the molar ratio Al/Ti=15. The reactor was temperature was set to 40° C. and 20 g of ethylene was fed into the reactor. After 4 minutes' prepolymerization, ethylene was continuously introduced into the reactor to maintain an ethylene pressure of 4 bar. The polymerisation was continued until 106 g monomer consumed. Thereafter reactor temperature was increased to 82° C. Then 56.3 L hydrogen was added, the temperature was increased to 85° C. and ethylene feed was started to maintain total pressure in the reactor of 54.8 bar. The polymerisation was continued until 229.5 g monomer consumed.

The split of polymer produced during the first step to the polymer produced during the second step was thus 13/87.

When the first polymerisation step was conducted individually the viscosity average molecular weight was 4280 kg/mol. The resulting polymer blend had $MFR_5$ of 39 g/10 min.

The polymerization conditions and properties of the UHMW polyethylene master batch MB1 for inventive example 1 (Ex1) are listed in Table 1.

c) Polymerization of In-situ UHMW Polyethylene Master Batches MB2-3 for Inventive Examples 2 and 3 (Ex2 and Ex3)

The polymerization procedure of Example 1 was repeated with the main difference of using a solid polymerization catalyst component sold by BASF under a trade name of Lynx 200 was introduced into the reactor together with triethylaluminium cocatalyst so that the ratio of aluminium to titanium was 15 mol/mol.

The polymerization conditions and properties of the UHMW polyethylene master batches MB2-3 for inventive examples 2 (Ex2) and 3 (Ex3) are listed in Table 1.

d) Polymerization of In-situ UHMW Polyethylene Resins Res4-5 for Comparative Examples 4 and 5 (CE4 and CE5)

The procedure of Example 2 was repeated except that the second polymerization stage was not conducted. The weight average molecular weight Mw of the polymer was 2,220 kg/mol as UHMW resin res4 for CE4 and of 1,590 kg/mol as UHMW resin res5 for CE5.

The polymerization conditions and properties of the UHMW polyethylene resins res4-5 for comparative examples 4 (CE4) and 5 (CE5) are listed in Table 1.

TABLE 1

UHMW polyethylene master batches for Ex1-Ex3 (MB1-MB3) and UHMW polyethylene resins for CE4 and CE5 (res4 and res5): polymerization conditions and properties

| Cocatalyst | MB1 TEA | MB2 TEA | MB3 TEA | res4 TEA | res5 TEA |
|---|---|---|---|---|---|
| Step 1 | | | | | |
| Temperature [° C.] | 40 | 40 | 50 | 40 | 60 |
| Pressure [bar] | 4 | 6 | 3 | 6 | 6 |
| Al/Ti [mol/mol] | 15 | 15 | 15 | 15 | 15 |
| Split [wt.-%] | 13 | 17 | 16 | 100 | 100 |
| Step 2 | | | | Not in use | Not in use |
| Temperature [° C.] | 85 | 95 | 95 | | |
| $H_2$ amount (l) | 56.3 | 42.5 | 42.5 | | |
| Split [wt.-%] | 87 | 83 | 84 | 0 | 0 |
| $MFR_5$ [g/10 min] | 38.66 | 2.34 | 2.17 | n.m | n.m |
| Mw [kg/mol] | 269 | 310 | 231 | 2,238 | 1,572 |
| Mn [kg/mol] | 5.0 | 6.0 | 5.3 | 20 | 4.1 |
| Mw/Mn | 54 | 52 | 44 | 112 | 383 |
| Mz [kg/mol] | 3010 | 3489 | 2140 | 3991 | 3653 | n.m. = not measured e) Preparation of the Multimodal Polyethylene Compositions of Inventive Examples 1 to 3 (Ex1-3) and Comparative Examples 4 to 7 (CE4-7)

The powders of the polyethylene resins of Table 1 were melt blended with commercially available bimodal PE100 resin HE3490-LSH (Borealis AG, Wien), being a bimodal high density polyethylene compound for pressure pipes including carbon black having a density of 959 kg/m³, and a $MFR_5$ of 0.25 g/10 min.

All the samples were produced with a co-rotating twin screw extruder Coperion ZSK 18. The temperature in the beginning of the melting zone of the extruder was set to 150° C. and in all the remaining zones to 230° C. The throughput was 0.8 kg/h and the screw speed was 120 RPM.

For inventive examples 1 to 3 (Ex1-3) the UHMW polyethylene master batches MB1-3 of Table 1 were used, for comparative examples 4 and 5 (CE4 and CE5) the UHMW polyethylene resins res4-5 of Table 1 were used together with a low molecular weight (LMW) ethylene homopolymer resin, produced in the presence of Lynx 200 catalyst (BASF) and TEA cocatalyst, having a density of >970 kg/m³ and a weight average molecular weight Mw of 28 kg/mol, a number average molecular weight Mn of 4 kg/mol and a z average molecular weight Mz of 224 kg/mol.

For Comparative example 6 (CE6) commercially available UHMW polyethylene master batch M2 (M2 MB) (Jingchem) having a weight average molecular weight of 760 kg/mol was used. Comparative example 7 (CE7) refers to the PE100 resin HE3490-LSH without addition of a UHMW polyethylene resin.

The composition of the samples is listed in Table 2.

TABLE 2

Composition of the multimodal polyethylene compositions of Inventive examples 1 to 3 (Ex1-3) and Comparative examples 4 to 7 (CE4-7)

| | Ex1 | Ex2 | Ex3 | CE4 | CE5 | CE6 | CE7 |
|---|---|---|---|---|---|---|---|
| HE3490 [wt %] | 84 | 88 | 87 | 88 | 87 | 93 | 100 |
| MB1 [wt %] | 16 | | | | | | |
| MB2 [wt %] | | 12 | | | | | |
| MB3 [wt %] | | | 13 | | | | |
| Res4 [wt %] | | | | 2 | | | |
| Res5 [wt %] | | | | | 2 | | |
| LMW [wt %] | | | | 10 | 11 | | |
| M2 MB [wt %] | | | | | | 7 | |

After compounding the homogeneity of the samples are detected via light microscope and quantified as white spot rating (WSR). The microtome cuts for evaluating the WSR for Examples Ex1-3 and Comparative Examples CE4-6 are shown in FIGS. 1-6.

Further the viscosity at a shear stress of 747 Pa is determined. The results are listed in Table 3.

TABLE 3

Properties of the multimodal polyethylene compositions of Inventive examples 1 to 3 (Ex1-3) and Comparative examples 4 to 7 (CE4-7)

| | Ex1 | Ex2 | Ex3 | CE4 | CE5 | CE6 | CE7 |
|---|---|---|---|---|---|---|---|
| WSR | 0.83 | 0.58 | 1.50 | 7.00 | 4.67 | 5.6 | 2.42 |
| $MFR_5$ [g/10 min] | 0.29 | 0.22 | 0.32 | 0.28 | 0.26 | 0.17 | 0.28 |
| $MFR_{21}$ [g/10 min] | 14.2 | 10.8 | 9.7 | 10.1 | 10.4 | 6.8 | 10.6 |
| Mw [kg/mol] | 222 | 237 | 247 | 243 | 232 | 259 | 228 |
| Mz [kg/mol] | 1510 | 1615 | 1705 | 1605 | 1555 | 1551 | 1350 |
| $Eta_{747}$ [kPa · s] | 941 | 1295 | 1175 | 902 | 766 | n.d. | 428 | n.d. = not determined f) Polymerization of In-situ UHMW Polyethylene Master Batches MB8 to MB11

The polymerization procedure of Example 1 was repeated except that the conditions and properties were as given in Table 4 g) Preparation of Comparative UHMW Polyethylene Master Batch MB12

For the preparation of the comparative UHMW master batch MB12 commercially available UHMW polyethylene master batch M2 (M2 MB) (Jingchem) having a weight average molecular weight of 760 kg/mol was compounded with a low molecular weight (LMW) ethylene homopolymer resin as described above in a weight ratio of 50:50.

The properties of the comparative UHMW polyethylene master batch MB12 12 is listed in Table 4.

TABLE 4

UHMW polyethylene master batches MB8-MB11 and comparative UHMW polyethylene master batch MB12: polymerization conditions and properties

| Cocatalyst | MB8 TEA | MB9 TEA | MB10 TEA | MB11 TEA | MB12 |
|---|---|---|---|---|---|
| Step 1 | | | | | |
| Temperature [° C.] | 70 | 70 | 50 | 50 | |
| Pressure [bar] | 4 | 6 | 3 | 6 | |
| Split [wt.-%] | 48 | 74 | 51 | 77 | |
| Step 2 | | | | | |
| Temperature [° C.] | 85 | 85 | 85 | 85 | |
| Split [wt.-%] | 52 | 26 | 49 | 23 | |
| $MFR_5$ [g/10 min] | 0.06 | 0.06 | 0.01 | 0.01 | 0.01 |
| $MFR_{21}$ [g/10 min] | 2.1 | 0.14 | 1.5 | 0.10 | 0.76 |
| $MFR_{21}/MFR_5$ | 35 | 2.3 | 153 | 10 | 76 |
| Mw [kg/mol] | 422 | 654 | 708 | 809 | 558 |
| Mn [kg/mol] | 5.8 | 10 | 5.6 | 8.7 | 8.0 |
| Mw/Mn | 72.5 | 66.3 | 127.2 | 93.4 | 65.7 |
| Mz [kg/mol] | 2520 | 2425 | 2725 | 3185 | n.d. |
| Density [kg/m³] | 973.6 | 965.1 | 971.1 | 964.1 | 967.1 |

TABLE 4-continued

UHMW polyethylene master batches MB8-MB11 and comparative UHMW polyethylene master batch MB12: polymerization conditions and properties

| Cocatalyst | MB8 TEA | MB9 TEA | MB10 TEA | MB11 TEA | MB12 |
|---|---|---|---|---|---|
| $Eta_{0.05}$ [kPa · s] | 1437 | 2528 | 2393 | 5538 | 1638 |
| $Eta_{747}$ [kPa · s] | 12776 | 19171 | 46558 | 912740 | n.d |
| WSR | 2.17 | 2.83 | 4.0 | 4.33 | 9.3 | n.d. = not determined h) Preparation of the Multimodal Polyethylene Compositions of Inventive Examples 8 to 10 (Ex 8-10), Inventive Examples 11 to 16 (Ex 11-16) and Comparative Example 17 (CE17)

The UHMW master batches MB8 to MB10 of Table 4 were melt blended with commercially available bimodal PE100 resin HE3490-LSH (Borealis AG, Wien), being a bimodal high density polyethylene compound for pressure pipes including carbon black having a density of 959 kg/m³, and a $MFR_5$ of 0.25 g/10 min.

For inventive examples 8 to 10 (Ex 8-10) the resins of compounded pellets of UHMW polyethylene master batches MB8 to MB10 were blended with HE3490-LSH, whereas for inventive examples 11 to 16 (Ex 11-16) the dried powders of UHMW polyethylene master batches MB8 to MB11 were blended with HE3490-LSH.

The same compounding conditions were used as described above for Examples 1 to 3.

The composition of the samples is listed in Table 5.

Comparative example 17 (CE17) refers to the PE100 resin HE3490-LSH without addition of a UHMW polyethylene resin.

TABLE 5

Composition of the multimodal polyethylene compositions of Inventive examples 8-11 (Ex8-10), Inventive examples 11-16 (Ex 11-16) and Comparative example 17 (CE17)

| | CE17 | Ex8 | Ex11 | Ex12 | Ex9 | Ex13 | Ex10 | Ex14 | Ex15 | Ex16 |
|---|---|---|---|---|---|---|---|---|---|---|
| HE3490 [wt %] | 100 | 94 | 94 | 91.5 | 96 | 96 | 91.2 | 91.2 | 94 | 96 |
| Pellets MB8 [wt %] | | 6 | | | | | | | | |
| Pellets MB9 [wt %] | | | | | 4 | | | | | |
| Pellets MB10 [wt %] | | | | | | | 8.8 | | | |
| Powder MB8 [wt %] | | | 6 | 9.5 | | | | | | |
| Powder MB9 [wt %] | | | | | | 4 | | | | |
| Powder MB10 [wt %] | | | | | | | | 8.8 | 6 | |
| Powder MB11 [wt %] | | | | | | | | | | 4 |

After compounding the homogeneity of the samples are detected via light microscope and quantified as white spot rating (WSR). Further the viscosity at a shear stress of 747 Pa is determined. The results are listed in Table 6.

TABLE 6

Properties of the multimodal polyethylene compositions of Inventive examples 8 to 10 (Ex8-10), Inventive examples 11 to 16 (Ex 11-16) and Comparative example 17 (CE17)

| | CE17 | Ex8 | Ex11 | Ex12 | Ex9 | Ex13 | Ex10 | Ex14 | Ex15 | Ex16 |
|---|---|---|---|---|---|---|---|---|---|---|
| WSR | 2.42 | 1.92 | 2.25 | 2.83 | 1.67 | 3.42 | 2.25 | 3.33 | 3.17 | 4.0 |
| $MFR_5$ [g/10 min] | 0.28 | 0.23 | 0.28 | 0.20 | 0.21 | 0.25 | 0.17 | 0.19 | 0.20 | 0.18 |

TABLE 6-continued

Properties of the multimodal polyethylene compositions of Inventive examples 8 to 10
(Ex8-10), Inventive examples 11 to 16 (Ex 11-16) and Comparative example 17 (CE17)

| | CE17 | Ex8 | Ex11 | Ex12 | Ex9 | Ex13 | Ex10 | Ex14 | Ex15 | Ex16 |
|---|---|---|---|---|---|---|---|---|---|---|
| $MFR_{21}$ [g/10 min] | 10.6 | 8.6 | 10.0 | 8.2 | 8.1 | 7.9 | 8.0 | 7.6 | 8.0 | 7.1 |
| Mw [kg/mol] | 228 | 251 | 260 | 265 | 249 | 248 | 292 | 305 | 272 | 278 |
| Mz [$10^6$ g/mol] | 1.35 | 1.44 | 1.74 | 1.80 | 1.50 | 1.54 | 2.18 | 2.24 | 1.74 | 1.78 |
| $Eta_{747}$ [kPa·s] | 428 | 607 | 624 | 724 | 604 | 613 | 1267 | 1195 | 988 | 966 |
| Density [kg/m$^3$] | 961.2 | 962.4 | 961.5 | 962.4 | 962.3 | 961.4 | 963.4 | 962.1 | 961.7 | 961.6 |

The invention claimed is:

1. A process for producing a multimodal polyethylene composition comprising the following steps:
  i) polymerizing a polyethylene fraction (A-1) having a weight average molecular weight Mw of equal to or more than 500 kg/mol to equal to or less than 10,000 kg/mol and a density of equal to or more than 915 kg/m³ to equal to or less than 960 kg/m³ in a first reaction step and then polymerizing a polyethylene fraction (A-2) having a lower Mw as polyethylene fraction (A-1) and a density of equal to or more than 910 kg/m³ to equal to or less than 975 kg/m³ in a second reaction step of a sequential multistage process wherein one of said polyethylene fractions is polymerized in the presence of the other of said polyethylene fractions to form a first polyethylene resin (A) having a weight average molecular weight Mw of equal to or more than 150 kg/mol to equal to or less than 1,500 kg/mol, and a density of equal to or more than 910 kg/m³ to equal to or less than 975 kg/m³, wherein the weight average molecular weight Mw of the first polyethylene resin (A) is lower than the weight average molecular weight Mw of the polyethylene fraction (A-1);
  ii) blending the first polyethylene resin (A) with a second polyethylene resin (B) having a weight average molecular weight Mw of equal to or more than 50 kg/mol to less than 500 kg/mol, and a density of equal to or more than 910 kg/m³ to equal to or less than 970 kg/m³ to form said multimodal polyethylene composition,
  wherein the multimodal polyethylene composition has a melt flow rate $MFR_5$ (190° C., 5 kg) of 0.01 to 10 g/10 min and a density of equal to or more than 910 kg/m³ to equal to or less than 970 kg/m³ and the weight ratio of said first polyethylene resin (A) to said second polyethylene resin (B) in the polyethylene composition is 2:98 to 40:60; and
  wherein the blending step ii) is performed by mechanical blending.

2. The process according to claim 1, wherein said first polyethylene resin (A) is pelletized prior to blending with said second polyethylene resin (B) to form the polyethylene composition.

3. The process according to claim 1, wherein said first polyethylene resin (A) is blended in powder form with said second polyethylene resin (B) to form the polyethylene composition.

4. The process according to claim 1, wherein said polyethylene fraction (A-2) is polymerized in the presence of said polyethylene fraction (A-1).

5. The process according to claim 1, wherein the polyethylene composition is formed by melt blending of said first polyethylene resin (A) and said second polyethylene resin (B).

6. The process according to claim 1, wherein the amount of said polyethylene fraction (A-1) is 0.5 to 36 wt % of the total amount of the polyethylene composition.

* * * * *